US010917188B2

(12) United States Patent
Lee et al.

(10) Patent No.: US 10,917,188 B2
(45) Date of Patent: Feb. 9, 2021

(54) METHOD FOR PERFORMING COMMUNICATION USING TDD FRAME IN WIRELESS COMMUNICATION SYSTEM, AND DEVICE THEREFOR

(71) Applicant: LG ELECTRONICS INC., Seoul (KR)

(72) Inventors: Hojae Lee, Seoul (KR); Sangrim Lee, Seoul (KR); Kwangseok Noh, Seoul (KR); Dongkyu Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/771,638

(22) PCT Filed: Jul. 27, 2016

(86) PCT No.: PCT/KR2016/008251
§ 371 (c)(1),
(2) Date: Apr. 27, 2018

(87) PCT Pub. No.: WO2017/086570
PCT Pub. Date: May 26, 2017

(65) Prior Publication Data
US 2018/0316451 A1 Nov. 1, 2018

Related U.S. Application Data

(60) Provisional application No. 62/257,747, filed on Nov. 20, 2015.

(51) Int. Cl.
| H04J 11/00 | (2006.01) |
| H04W 56/00 | (2009.01) |
| H04B 7/26 | (2006.01) |
| H04L 25/02 | (2006.01) |
| H04L 5/00 | (2006.01) |

(Continued)

(52) U.S. Cl.
CPC ........ H04J 11/0023 (2013.01); H04B 7/2656 (2013.01); H04J 11/0079 (2013.01);
(Continued)

(58) Field of Classification Search
CPC .. H04J 11/0023; H04J 11/00; H04W 56/0015; H04W 72/0406; H04W 72/0446;
(Continued)

(56) References Cited

U.S. PATENT DOCUMENTS

| 10,531,365 B2 * | 1/2020 | Kaur ................... H04W 24/04 |
| 2013/0107827 A1 | 5/2013 | Dinan |

(Continued)

FOREIGN PATENT DOCUMENTS

WO 2014178664 A1 11/2014

OTHER PUBLICATIONS

Lizia Xue et al., "Next Generation TDD Cellular Communication", In: Signals, Systems and Computers, 2015 49th Asilomar Conference on, Nov. 8-11, 2015, pp. 1036-1046.

*Primary Examiner* — Un C Cho
*Assistant Examiner* — Yu-Wen Chang
(74) *Attorney, Agent, or Firm* — Dentons US LLP

(57) ABSTRACT

A method for a terminal performing communication using a TDD frame in a wireless communication system may comprises the steps of: receiving a first synchronization signal from the first symbol of a first subframe of a TDD frame; receiving a second synchronization signal from the first symbol of a second subframe of the TDD frame; and receiving system information from the first symbol of at least one subframe comprising a third subframe of the TDD frame.

10 Claims, 13 Drawing Sheets

US 10,917,188 B2
Page 2

(51) Int. Cl.
*H04L 5/14* (2006.01)
*H04W 72/04* (2009.01)

(52) U.S. Cl.
CPC .............. *H04L 5/0048* (2013.01); *H04L 5/14* (2013.01); *H04L 25/0202* (2013.01); *H04L 25/0224* (2013.01); *H04W 56/0015* (2013.01); *H04W 72/0406* (2013.01); *H04W 72/0446* (2013.01); *H04J 11/005* (2013.01); *H04J 11/0073* (2013.01); *H04J 11/0076* (2013.01)

(58) Field of Classification Search
CPC . H04B 7/2656; H04L 25/0202; H04L 5/0048; H04L 5/14
See application file for complete search history.

(56) References Cited

U.S. PATENT DOCUMENTS

| | | | |
|---|---|---|---|
| 2013/0315321 A1 | 11/2013 | Rajagopal et al. | |
| 2014/0133427 A1* | 5/2014 | Kim | H04L 5/0053 370/329 |
| 2014/0185539 A1* | 7/2014 | Seo | H04B 7/2656 370/329 |
| 2014/0364065 A1* | 12/2014 | Pu | H04W 24/10 455/67.11 |
| 2015/0078292 A1 | 3/2015 | Walker et al. | |
| 2015/0201431 A1* | 7/2015 | Um | H04L 5/0048 370/280 |
| 2015/0373668 A1* | 12/2015 | Lee | H04W 72/042 370/329 |
| 2016/0112892 A1* | 4/2016 | Damnjanovic | H04W 24/10 370/336 |
| 2016/0135143 A1* | 5/2016 | Won | H04W 72/005 370/312 |
| 2016/0353476 A1* | 12/2016 | Sartori | H04L 5/0005 |
| 2017/0367058 A1* | 12/2017 | Pelletier | H04W 56/0045 |
| 2018/0184390 A1* | 6/2018 | Wu | H04L 27/2613 |
| 2018/0198562 A1* | 7/2018 | Caretti | H04W 72/121 |

* cited by examiner

METHOD FOR PERFORMING COMMUNICATION USING TDD FRAME IN WIRELESS COMMUNICATION SYSTEM, AND DEVICE THEREFOR

This application is a 35 use § 371 national stage entry of international application no. PCT/KR2016/008251 filed on Jul. 27, 2016, and claims priority to U.S. provisional application No. 62/257,747 filed on Nov. 20, 2015, all of which are hereby incorporated by reference in their entireties as if fully set forth herein.

TECHNICAL FIELD

The present invention relates to a wireless communication system, and more particularly, to a method of performing communication using a TDD frame in a wireless communication system and an apparatus therefor.

BACKGROUND ART

3GPP LTE (3rd Generation Partnership Project Long Term Evolution) system is designed with a frame structure having a TTI (transmission time interval) of 1 ms and data requirement latency time for a video application is 10 ms. Yet, with the advent of a new application such as real-time control and tactile internet, 5G technology in the future requires data transmission of lower latency and it is anticipated that 5G data requirement latency time is going to be lowered to 1 ms.

However, the legacy frame structure of 1 ms TTI is unable to satisfy the 1 ms data requirement latency. 5G aims to provide data latency reduced as much as 10 times compared to the legacy data latency.

Although 5G communication system requires a new frame structure to solve the abovementioned problem, the new frame structure has not been proposed yet.

DISCLOSURE OF THE INVENTION

Technical Tasks

A technical task of the present invention is to provide a method for a UE to perform communication using a TDD frame in a wireless communication system.

Another technical task of the present invention is to provide a method for a UE to perform communication using a predefined frame in a wireless communication system.

Another technical task of the present invention is to provide a UE performing communication using a TDD frame in a wireless communication system.

The other technical task of the present invention is to provide a UE performing communication using a predefined frame in a wireless communication system.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method for performing communication, by a user equipment, using a TDD (time division duplex) frame in a wireless communication system, includes receiving a first synchronization signal in a first symbol of a first subframe of the TDD frame, receiving a second synchronization signal in a first symbol of a second subframe of the TDD frame, and receiving system information in a first symbol of at least one subframe including a third subframe of the TDD frame.

The method can further include the steps of obtaining a physical cell identifier from the first synchronization signal and the second synchronization signal, performing channel estimation for a reference signal on the first symbol of the at least subframe based on obtained physical cell identifier based sequence, and decoding the system information based on information of the estimated channel. The decoding may be performed after channel equalization is performed based on the information of estimated channel.

The method may further include the steps of obtaining a cell index from the first synchronization signal, obtaining a physical cell group identifier from the second synchronization signal, and obtaining a physical cell identifier based on the obtained cell index and the obtained physical cell group identifier.

The method can further include the step of transmitting uplink control information through an uplink control zone including at least one last symbol in the first subframe.

To further achieve these and other advantages and in accordance with the purpose of the present invention, according to a different embodiment, a method for performing communication, by a user equipment, using a predefined frame in a wireless communication system, includes receiving system information including information indicating whether the predefined frame corresponds to a TDD frame or an FDD frame and information indicating CP (cyclic prefix) duration applied to the predefined frame, and decoding a received downlink control channel based on the system information. If the wireless communication system uses filtered OFDM (orthogonal frequency division multiplex) corresponding to a new waveform, the system information can further include information indicating a type of a filter used for the predefined frame. The method may further include searching for common control information based on decoding information according to the decoding the downlink control channel. The UE may search for the common control information in a downlink control zone or a downlink data zone included in a subframe of the predefined frame.

To further achieve these and other advantages and in accordance with the purpose of the present invention, according to a further different embodiment, a user equipment for performing communication using a TDD (time division duplex) frame in a wireless communication system includes a receiver and a processor, the processor configured to receive a first synchronization signal in a first symbol of a first subframe of the TDD frame, the processor configured to receive a second synchronization signal in a first symbol of a second subframe of the TDD frame, the processor configured to receive system information in a first symbol of at least subframe including a third subframe of the TDD frame.

The processor can be configured to obtain a physical cell identifier from the first synchronization signal and the second synchronization signal, perform channel estimation on a reference signal in the first symbol of the at least subframe based on obtained physical cell identifier based sequence, and decode the system information based on information of the estimated channel information. The processor can be configured to perform the decoding after channel equalization is performed based on information of the estimated channel information.

To further achieve these and other advantages and in accordance with the purpose of the present invention, according to a further different embodiment, a user equipment for performing communication using a predefined frame in a wireless communication system includes a receiver configured to receive system information including information indicating whether the predefined frame corresponds to a TDD frame or an FDD frame and information indicating CP (cyclic prefix) duration applied to the predefined frame, and a processor configured to decode a received downlink control channel based on the system information. If the wireless communication system uses filtered OFDM (orthogonal frequency division multiplex) corresponding to a new waveform, the system information can further include information indicating a type of a filter used for the predefined frame. The processor can be configured to search for common control information based on decoding information according to the decoding the downlink control channel.

Advantageous Effects

According to DL synchronization and SI transmission methods proposed by the present invention, it is able to minimize a system throughput loss while DL/UL flexibility of a self-contained frame structure is not deteriorated.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE

Mode for Invention

Figure 1:
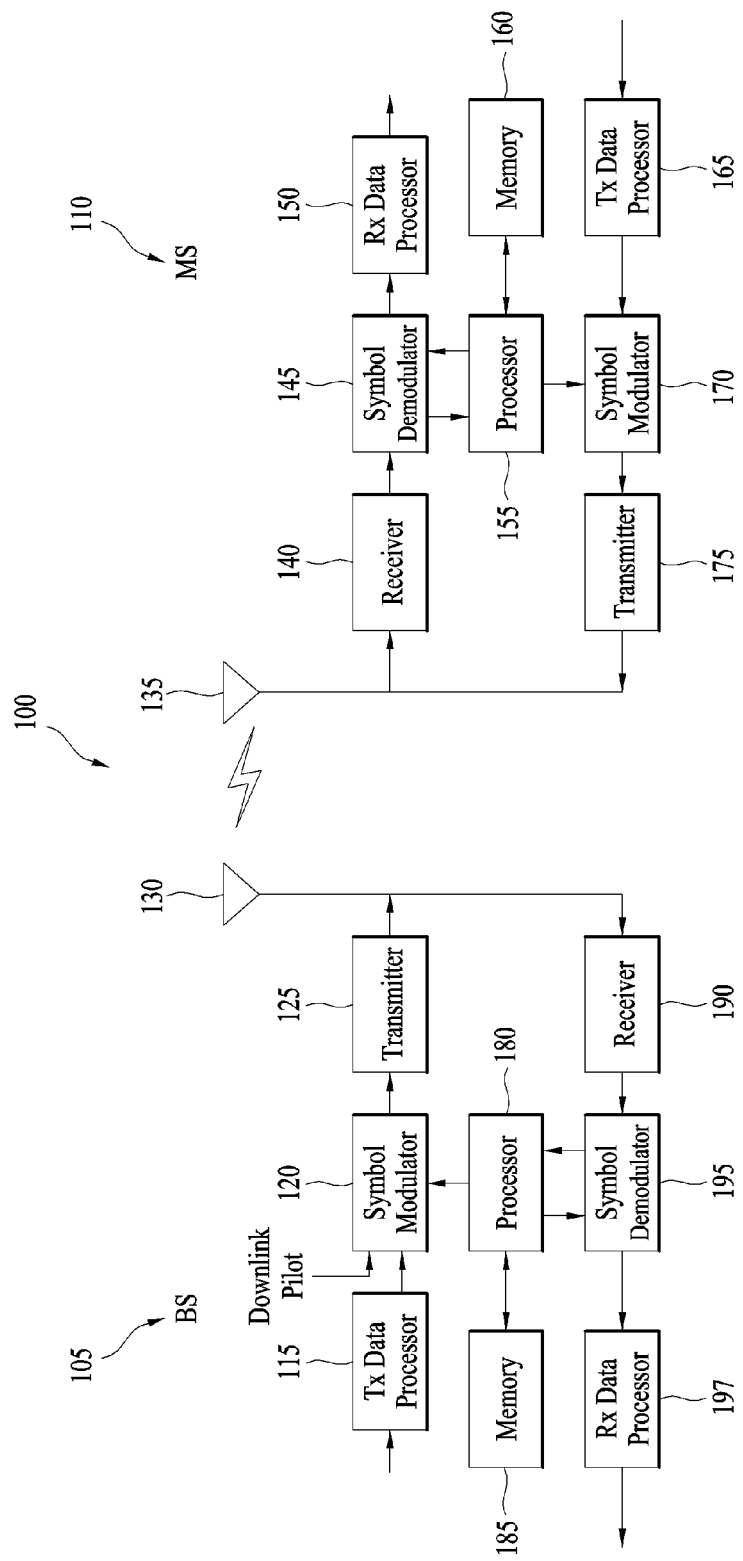
FIG. 1 is a block diagram for configurations of a base station 105 and a user equipment 110 in a wireless communication system 100.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present invention may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

In case of performing wireless transmission between a base station and a UE, a transmission to the UE from the base station is commonly referred to as a DL transmission and a transmission to the base station from the UE is commonly referred to as a UL transmission. A scheme of determining a radio resource between the DL transmission and the UL transmission is defined as duplex. When a frequency band is divided into a DL transmission band and a UL transmission band and transmission and reception are performed in both directions, it is referred to as frequency division duplex (FDD).

FIG. 1 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmission data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmission data processor 115 in the base station 105, respectively.

In the user equipment 110 in uplink, the transmission data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

The present invention proposes new and various frame structures for a $5^{th}$ generation (5G) communication system. In a next generation 5G system, scenarios can be classified into Enhanced Mobile BroadBand (eMBB), Ultra-reliable Machine-Type Communications (uMTC), Massive Machine-Type Communications (mMTC), and the like. The eMBB corresponds to a next generation mobile communication scenario having such a characteristic as high spectrum efficiency, high user experienced data rate, high peak data rate, and the like, the uMTC corresponds to a next generation mobile communication scenario having such a characteristic as ultra-reliable, ultra-low latency, ultra-high availability, and the like (e.g., V2X, Emergency Service, Remote Control), and the mMTC corresponds to a next generation mobile communication scenario having such a characteristic as low cost, low energy, short packet, and massive connectivity (e.g., IoT).

Figure 2:
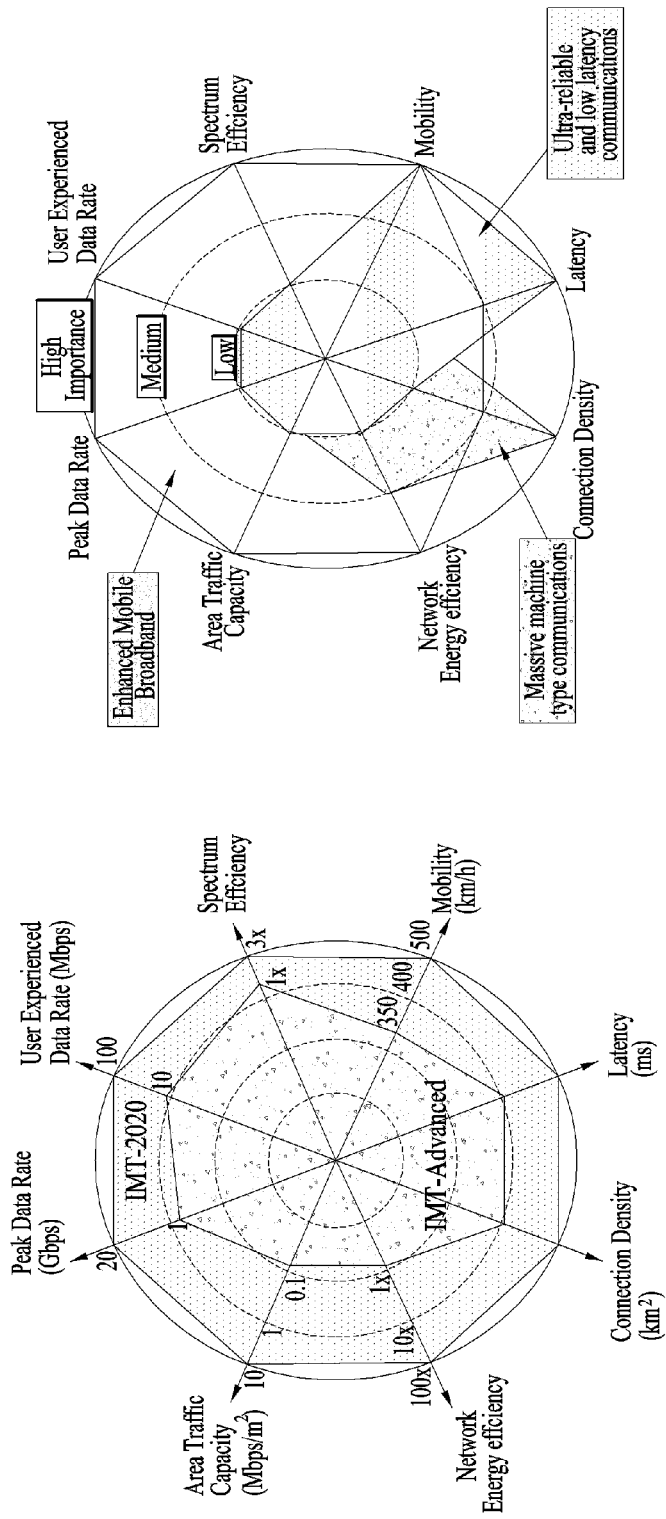
FIG. 2 is a diagram for explaining correlation between IMT 2020 core performance requirement for 5G and 5G performance requirement per service scenario.

FIG. 2 is a diagram for explaining correlation between IMT 2020 core performance requirement for 5G and 5G performance requirement per service scenario.

FIG. 2 illustrates correlation between core performance requirement for 5G proposed by IMT 2020 and 5G performance requirement per service scenario.

In particular, uMTC service has very high restriction on Over The Air (OTA) Latency Requirement and requires high mobility and high reliability (OTA Latency: <1 ms, Mobility: >500 km/h, BLER: <$10^{-6}$).

Figure 3:
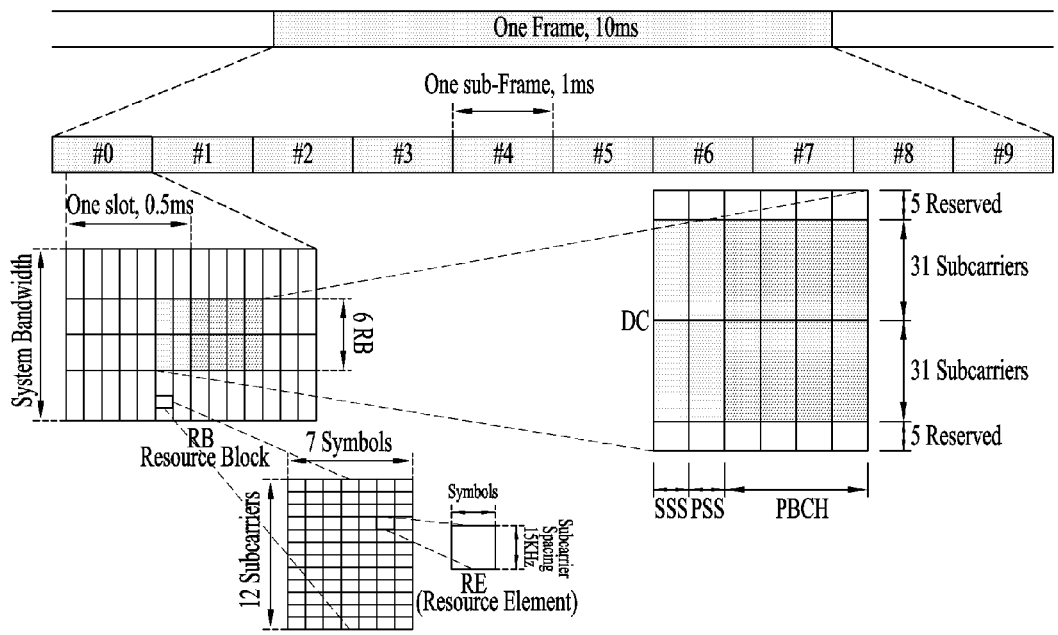
FIG. 3 is a diagram for LTE/LTE-A frame structure.

FIG. 3 is a diagram for LTE/LTE-A frame structure.

FIG. 3 shows a basic concept of a frame structure of LTE/LTE-A. One frame corresponds to 10 ms and includes 10 1-ms subframes. One subframe includes 2 0.5-ms slots and one slot includes 7 OFDM (Orthogonal Frequency Division Multiplexing) symbols. One resource block (RB) is defined by 12 subcarriers each of which has 15 kHz space and 7 OFDM symbols. A base station delivers a primary synchronization signal (PSS) and a secondary synchronization signal (SSS) for synchronization a physical broadcast channel (PBCH) for system information in a center frequency (6 RBs). In this case, it may have a difference in the frame structure and positions of the signal and the channel depending on a normal/extended CP (cyclic prefix) and TDD (Time Division Duplex)/FDD (Frequency Division Duplex).

Figure 4:
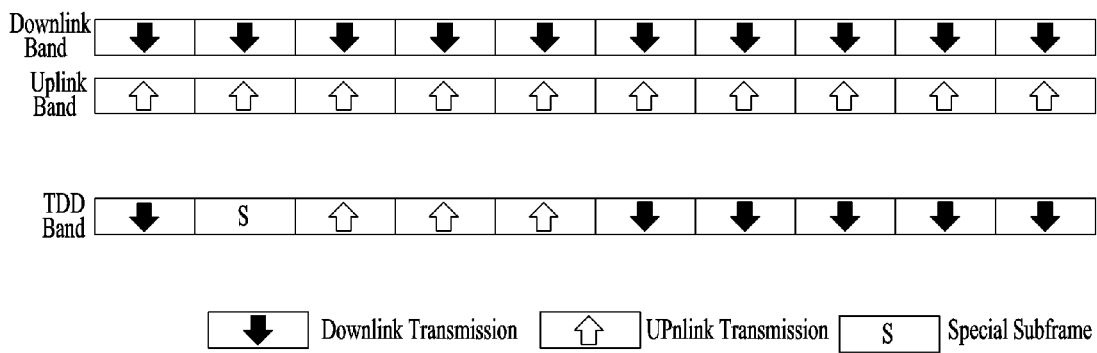
FIG. 4 is a diagram for an example of FDD/TDD frame structure in LTE/LTE-A system.

FIG. 4 is a diagram for an example of FDD/TDD frame structure in LTE/LTE-A system.

Referring to FIG. 4, in case of a FDD frame structure, a downlink frequency band is distinguished from an uplink frequency band. In case of a TDD frame structure, a downlink region is distinguished from an uplink region in a subframe unit in the same band.

Figure 5:
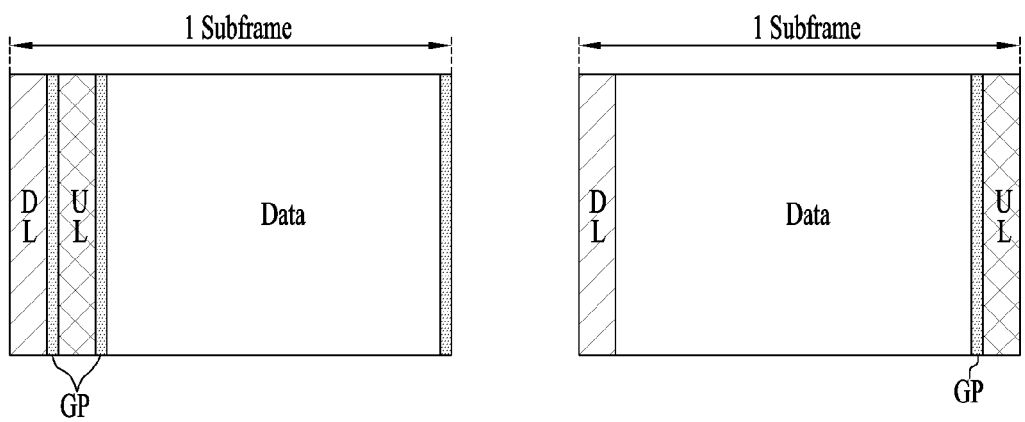
FIG. 5 is a diagram for an example of a self-contained subframe structure.

FIG. 5 is a diagram for an example of a self-contained subframe structure.

FIG. 5 illustrates a self-contained subframe structure which is proposed to satisfy a low-latency requirement among 5G performance requirements. A TDD-based self-contained subframe structure has a resource section for downlink, a resource section for uplink (e.g., a downlink control channel and an uplink control channel), a guard period (GP) for solving an interference issue between downlink and uplink, and a resource section for data transmission in a single subframe.

FIG. 5(*a*) shows an example of a self-contained subframe structure. A subframe is configured in an order of a resource section for downlink, a resource section for uplink, and a resource section for data and a GP exists between the resource sections. In FIG. 5(*a*), a downlink resource section represented as DL may correspond to a resource section for a downlink control channel and an uplink resource section represented as UL may correspond to a resource section for an uplink control channel.

FIG. 5(*b*) shows a different example of a self-contained subframe structure. A subframe is configured in an order of a resource section for downlink, a resource section for data, and a resource section for uplink and a GP exists prior to the resource section for uplink only. In FIG. 5(*b*), a downlink resource section represented as DL may correspond to a resource section for a downlink control channel and an uplink resource section represented as UL may correspond to a resource section for an uplink control channel.

The next generation 5G system is considering V2X targeting ultra-low latency, eMBB service targeting emergency service, machine control, and data speed, and the like. Hence, it is necessary to design a frame structure capable of supporting low latency (OTA<1 ms) and high degree of freedom of DL/UL data. And, it is necessary to design a commonality-based single frame structure which is not necessary to be redesigned in TDD or FDD operation scheme.

In order to provide the low latency and the degree of freedom of DL/UL data configuration in the next generation 5G system, the present invention proposes a method of configuring a new frame structure and a control zone. In the present specification, such a term as a zone indicates a resource. Such a terms as a region, a channel, and the like can be used together with the zone in the same meaning.

Proposal 1: New Frame Structure (Adaptive/Self-Contained Frame Structure) for 5G Systems It is difficult to satisfy a requirement of OTA<1 ms in a current LTE/LTE-A TDD frame structure. And, although TDD scheme provides various TDD DL/UL configurations to efficiently support asymmetry (DL traffic>UL traffic) of DL/UL data amount, it causes a complex procedure for HARQ (hybrid automatic repeat request) ACK/NACK time depending on a TDD DL/UL configuration. In order to solve the problem, as shown in FIG. 5, self-contained frame structures provide an opportunity for transmitting ACK/NACK in every subframe by simultaneously configuring a DL control zone (or, a DL control channel, a DL control region) and an UL control zone in a single subframe.

Figure 6:
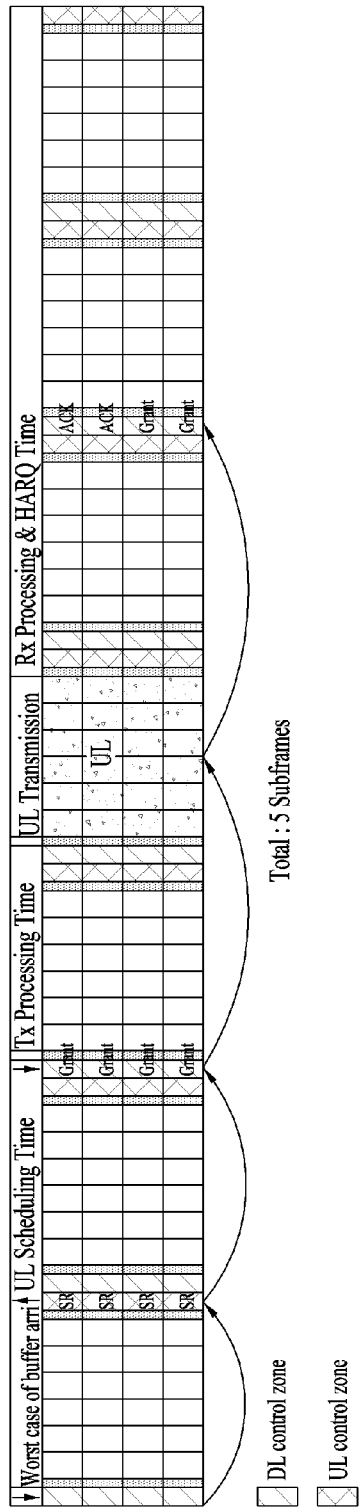
FIG. 6 is a diagram for a HARQ procedure when a UL resource of a data zone is immediately allocated.

FIG. 6 is a diagram for a HARQ procedure when a UL resource of a data zone is immediately allocated.

When a data zone is always guaranteed as an UL data zone or a DL data zone (or, DL data region) based on the subframe structure shown in FIG. 5(b), it may be able to perform a HARQ procedure within 5 subframes between OTA (w/initiation), i.e., UL buffer arrival, and final ACK/NACK reception.

FIG. 6 illustrates an example that HARQ ACK is received within 5 subframes. A corresponding procedure is described in the following. Subframe #1: if a data to be transmitted in UL is generated and a buffer arrival event is triggered, a UE transmits a scheduling request (SR) using an UL control zone. A subframe #2 corresponds to time for performing UL scheduling. A subframe #3 corresponds to a DL control zone. The UE receives a UL grant and prepares data to be transmitted in the subframe #3. The UE transmits UL data via a data zone in a subframe #4. A subframe #5 corresponds to time for a base station to receive data and perform Rx processing. The UE receives ACK via a DL control channel in a subframe #6.

According to the abovementioned procedure, from the timing at which the buffer arrival event occurred to the timing at which the ACK is received, it is able to see that the procedure occurs within 5 subframes. Hence, if TTI is configured by 0.2 ms, 'OTA (w/initiation)<1 ms' is satisfied. However, since a data zone is restricted to a UL data zone or a DL data zone in a single subframe, if DL (or UL) traffic considerably occurs, as shown in FIG. 7, it is apparent that a case of failing to transmit DL (or UL) traffic occurs.

Figure 7:
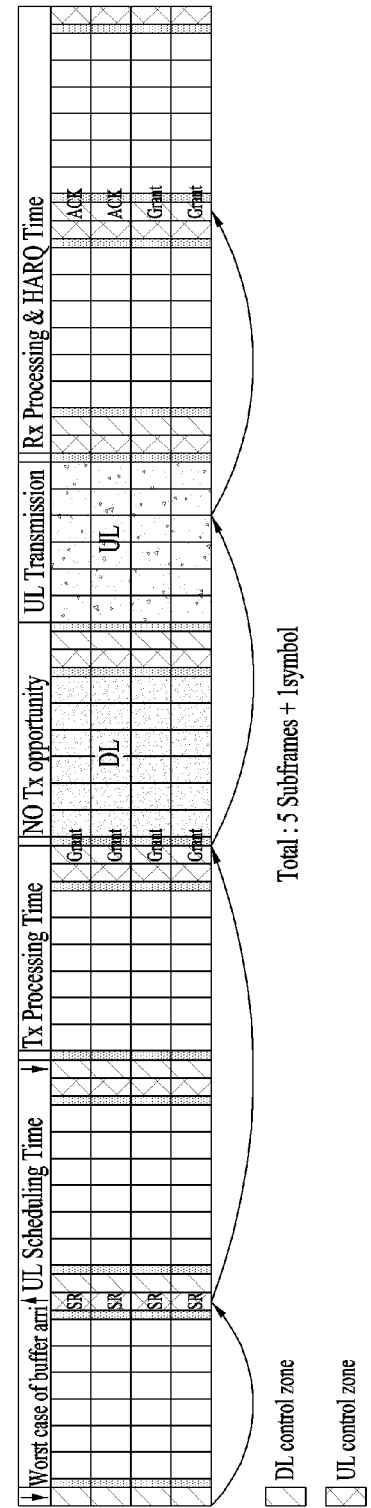
FIG. 7 is a diagram for a HARQ procedure when a UL resource of a data zone is not immediately allocated.

FIG. 7 is a diagram for a HARQ procedure when a UL resource of a data zone is not immediately allocated.

As shown in FIG. 7, if it fails to perform scheduling on UL data due to DL traffic for other UEs in a fourth subframe form the left side, latency as much as 1 subframe occurs and it is unable to satisfy 'OTA (w/initiation)<1 ms'. Moreover, if it is necessary to transmit more DL traffic, the latency is going to be extended. In particular, in order to achieve not only asymmetry of DL/UL traffic amount but also low latency, it is necessary to guarantee the degree of freedom of DL/UL traffic as much as possible in a data zone.

The present invention proposes a new frame structure capable of satisfying low latency and DL/UL data flexibility on the basis of a single carrier.

Proposal 1-1

Figure 8:
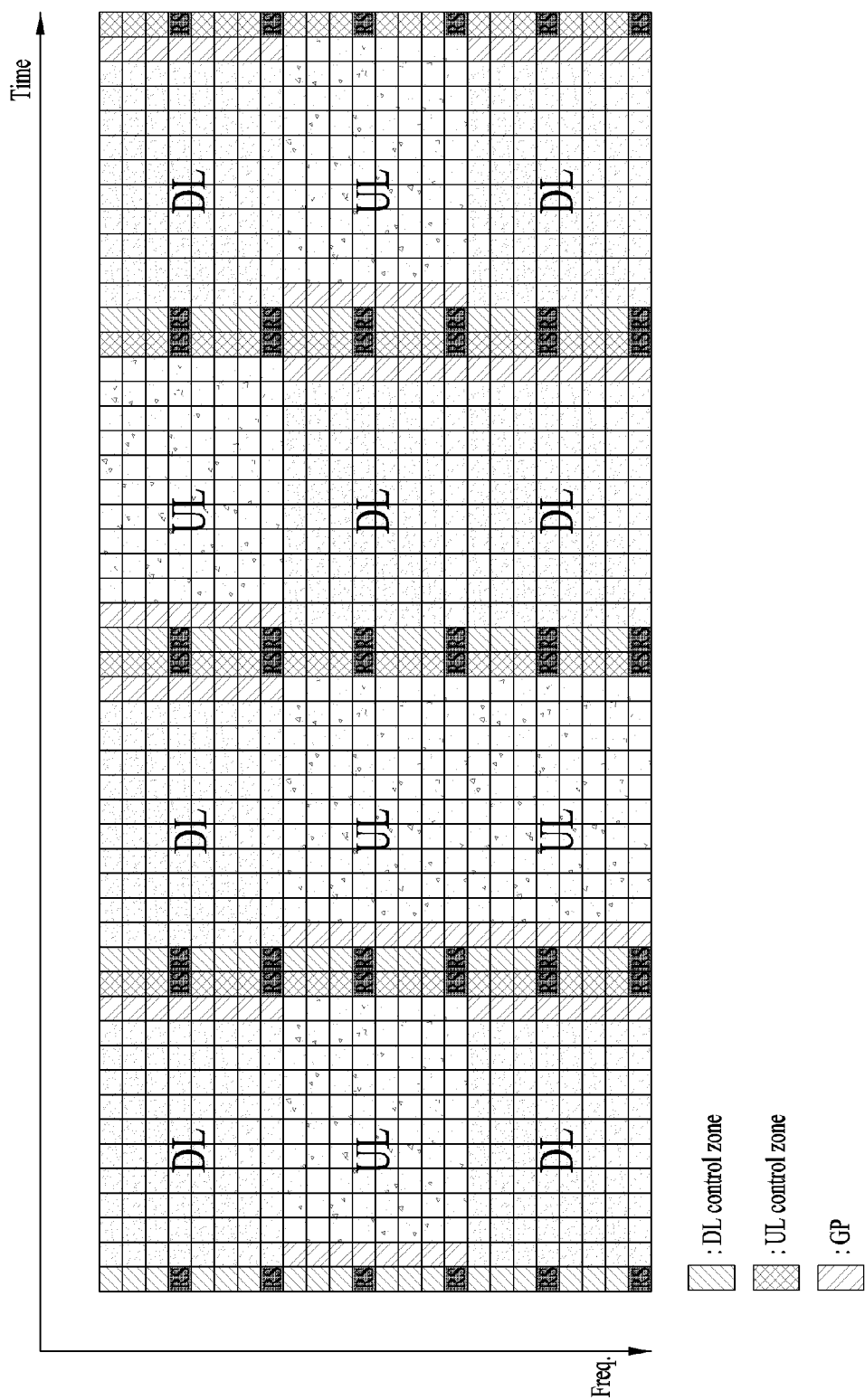
FIG. 8 is a diagram for a new frame structure according to a proposal 1-1 of the present invention.

FIG. 8 is a diagram for a new frame structure according to a proposal 1-1 of the present invention.

As shown in FIG. 8, a subframe is mainly divided into a DL control zone (or DL control channel), a GP, a data zone (data region or data channel), and a UL control zone (or UL control channel) on a single carrier. A frame structure shown in FIG. 8 corresponds to a frame structure which is configured under the assumption that a base station operates in a full duplex radio (FDR) scheme. Meanwhile, the frame structure shown in FIG. 8 may correspond to a frame structure allocated by a base station for a single UE. For example, if the frame structure shown in FIG. 8 corresponds to a frame structure allocated by a base station for a single UE, a DL data zone, a UL data zone, and a UL data zone are allocated to the UE according to a band in frequency domain direction in a first subframe shown in FIG. 8. In this case, the UE receives DL data from the base station on a band represented by DL and transmits UL data to the base station on a band represented by UL. In particular, the frame structure shown in FIG. 8 may correspond to a frame structure allocated to the UE under the assumption that the UE is able to operate in the FDR as well.

In FIG. 8, the DL data zone and the UL data zone, which are allocated according to a band in a subframe, can be differently configured according to a subframe. For example, referring to FIG. 8, a DL data zone, a UL data zone, and a UL data zone can be allocated according to a band in frequency domain direction in a second subframe.

As shown in FIG. 8, a DL control zone is located at the first (start) of a subframe in time domain, a data zone (a zone represented by DL, UL) is located right after the DL control zone, and a UL control zone is lastly located after the data zone. In this case, the data zone can be used as a DL data or a UL data in frequency domain without any restriction. And, a GP is located between the DL control zone and the data zone when data belonging to a corresponding band corresponds to UL. On the contrary, when data corresponds to DL, a GP is located between the data zone and the UL control zone.

As shown in FIG. 8, a UL transmission occasion and a DL transmission occasion exist at the same time in a data zone in every subframe. In particular, it is able to prevent additional latency due to the restriction of a legacy data zone restricted to DL or UL. If a length of a subframe is configured to be equal to or less than 0.2 ms, it is able to achieve 'OTA (w/initiation)<1 ms'.

Moreover, a base station may have more efficiency via DL/UL flexibility of the data zone in the aspect of utilizing DL/UL data resource compared to a legacy self-contained TDD frame structure. Hence, the frame structure shown in FIG. 8 is able to get rid of inefficiency due to the asymmetry of DL/UL traffic and achieve low latency.

Embodiment of Proposal 1-1

Embodiment for a method of achieving low latency and an operating method when DL data transmission timing is overlapped with UL data transmission timing are described in the following.

Figure 9:
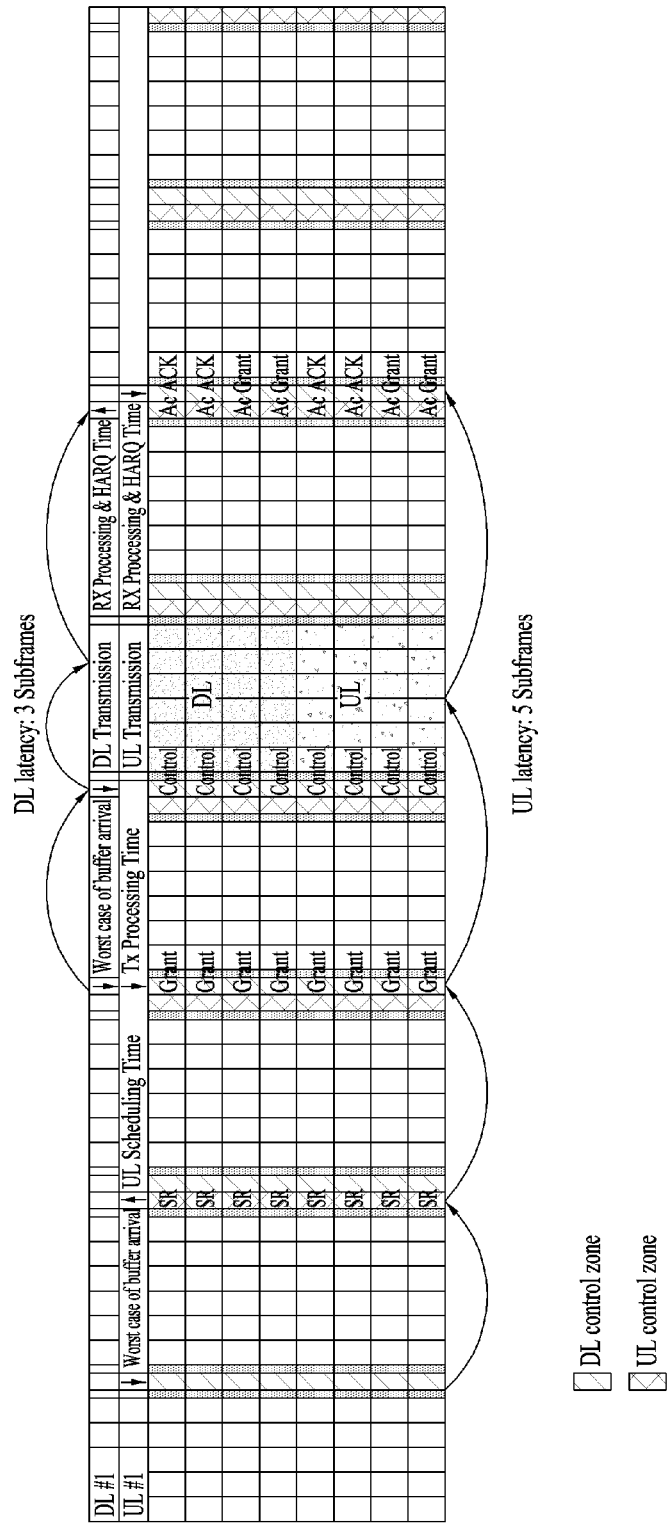
FIG. 9 is a diagram for explaining a case that DL transmission timing is overlapped with UL transmission timing.

FIG. 9 is a diagram for explaining a case that DL transmission timing is overlapped with UL transmission timing.

As shown in FIG. 9, when a DL buffer arrival event and a DL buffer arrival event respectively occur, one of the two buffer arrival events has no choice but to be delayed in a legacy frame structure. In FIG. 9, it is assumed that 2 traffics (DL traffic and UL traffic) are overlapped. If more traffic occurs at the same time, more latency may occur.

On the other hand, referring to a frame structure shown in FIG. 9, since a DL data zone and a UL data zone are allocated within a subframe, it is able to transmit DL data and UL data at the same time and simultaneous transmission is also supported while minimum latency is maintained. The frame structure shown in FIG. 9 has a merit in that a gain increases according to the increase of traffic.

Proposal 1-2

A DL control zone and a UL control zone can be configured by 1 to N number of symbols. A GP is configured by an integer multiple of a symbol. More specifically, a length of a GP can be configured by an integer multiple of a unit symbol allocated to a data zone.

In general, a length of a GP is designed by a round trip time (RTT) and RF switching time (from DL to UL/from UL to DL). Hence, the length of the GP can be determined by a method of minimizing overhead in consideration of RTT and RF switching time overhead (e.g., a self-contained frame structure).

If the frame structure shown in FIG. 8 corresponds to a frame structure allocated by a base station for a plurality of UEs, the base station operates in a full duplex scheme that performs UL/DL data transmission and reception at the same time in a data zone. On the contrary, The UEs operate in a half-duplex scheme that performs either transmission or reception only. Hence, it is necessary for the base station to transmit DL data and receive UL data at the same time. In this case, if GPs are configured according to a legacy method, as shown in FIG. 10, it is apparent that interference occurs due to the mismatch between symbol boundaries.

Figure 10:
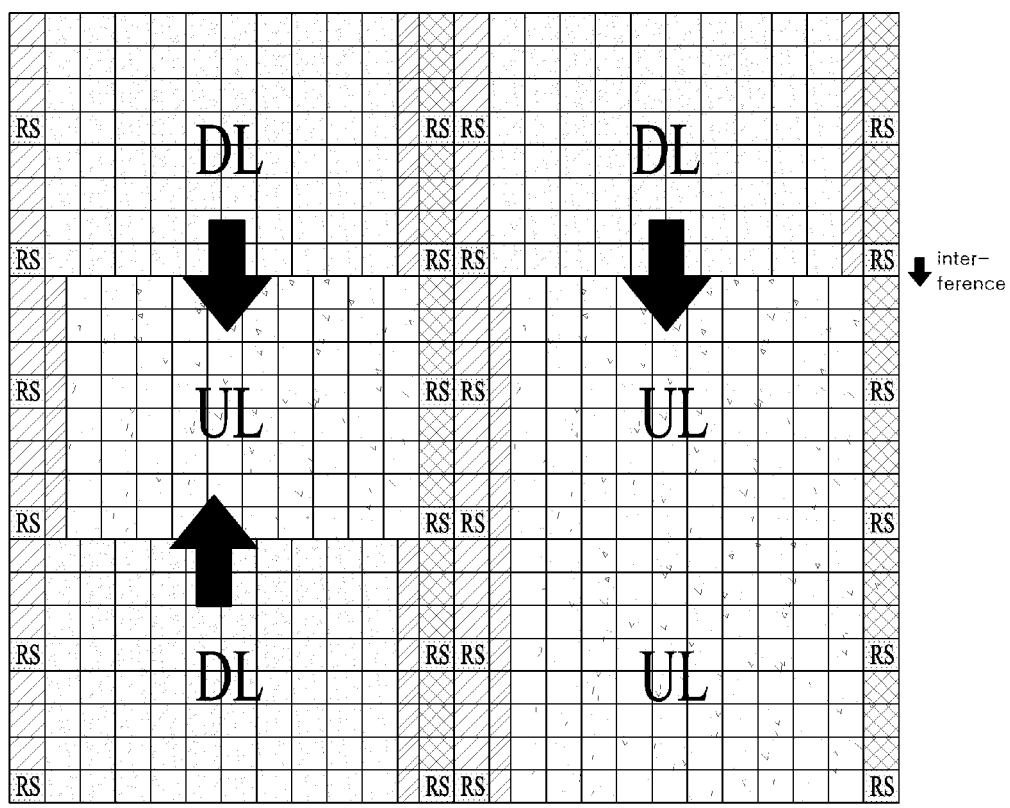
FIG. 10 is a diagram illustrating an example that a DL data symbol boundary is not matched with a UL data symbol boundary in a data zone in a base station.

FIG. 10 is a diagram illustrating an example that a DL data symbol boundary is not matched with a UL data symbol boundary in a data zone in a base station.

A base station receives data transmitted in DL within in-band. Hence, if a level of the mismatch is less than a CP length, it is able to receive UL data without interference on an ideal channel via orthogonality of OFDM. Yet, as shown in FIG. 10, a GP makes a symbol boundary between UL data and DL data to be mismatched. Hence, as shown in FIG. 8, it may be able to cancel the interference by configuring a GP length of a data zone by a symbol length.

In particular, the GP length of the data zone is configured to satisfy equation 1 in the following all the time by making the GP length to be an integer multiple of a length of a unit symbol that constructs the data zone.

$$\text{Length of data zone} \div \text{Number of symbols in data zone} = \text{Length of single symbol} = T\_cp + T\_u = GP \text{ length} + k \quad \text{[Equation 1]}$$

In this case, k is a natural number, T_cp corresponds to a CP length, and T_u corresponds to a length of a data part in a symbol. In particular, a length of a GP becomes an integer multiple of a length of a unit symbol that constructs a data zone.

And, a DL control zone and a UL control zone can be configured by N number of symbols without being restricted to a single symbol.

The frame structure shown in FIG. 10 requires a transceiver configured to perform DL and UL (i.e., transmission and reception) at the same time in a DL zone. A structure of the transceiver can be configured as follows.

Figure 11:
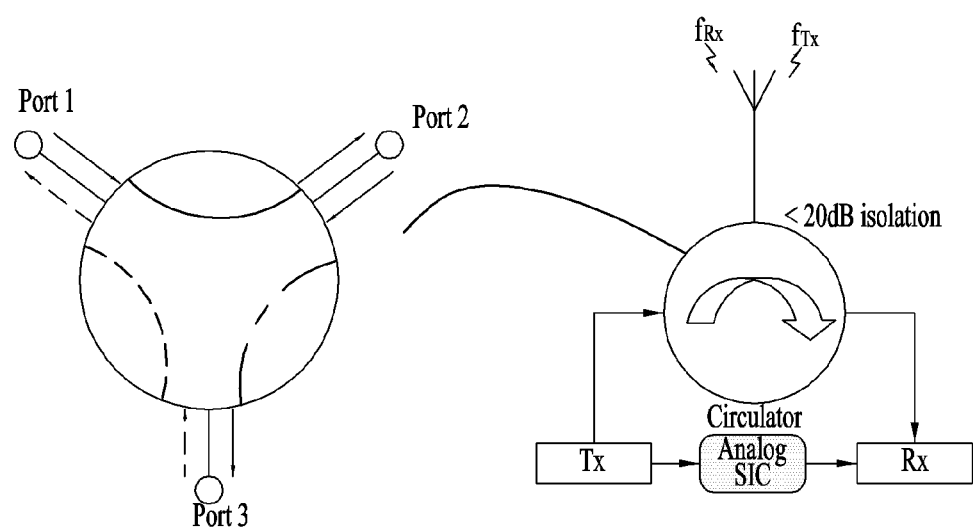
FIG. 11 is a diagram illustrating an example of an RF structure of a transceiver of a base station.

FIG. 11 is a diagram illustrating an example of an RF structure of a transceiver of a base station.

FIG. 11 illustrates configurations of devices for performing transmission and reception at the same time in a single carrier. First of all, in order to reduce power leakage that a signal transmitted by a base station is entering a receiving end, a signal is attenuated using a circulator. In addition, it may be able to additionally suppress a self-interference signal via an analog SIC device.

The frame structure proposed in the proposal 1 has the characteristic that transmission occasion of DL/UL traffic of FDD is always guaranteed in a legacy system. The frame structure can also efficiently use a resource according to asymmetry of DL/UL traffic of TDD.

In the following, a frame structure of a base station and a UE operating in a TDD or FDD mode is proposed.

Proposal 2-1

In a TDD carrier, a subframe is mainly divided into a DL control zone, a GP, a data zone, and a UL control zone. The DL control zone is located at the first of the subframe, the data zone is located right after the DL control zone, and the UL control zone is lastly located after the data zone. In this case, the data zone can be used as a DL data or a UL data in the subframe. And, a GP is located between the DL control zone and the data zone when data belonging to a corresponding band corresponds to UL. On the contrary, when data corresponds to DL data, a GP is located between the data zone and the UL control zone. The DL control zone and the UL control zone can be configured by 1 to N number of symbols. A GP is configured by an integer multiple of a symbol.

Figure 12:
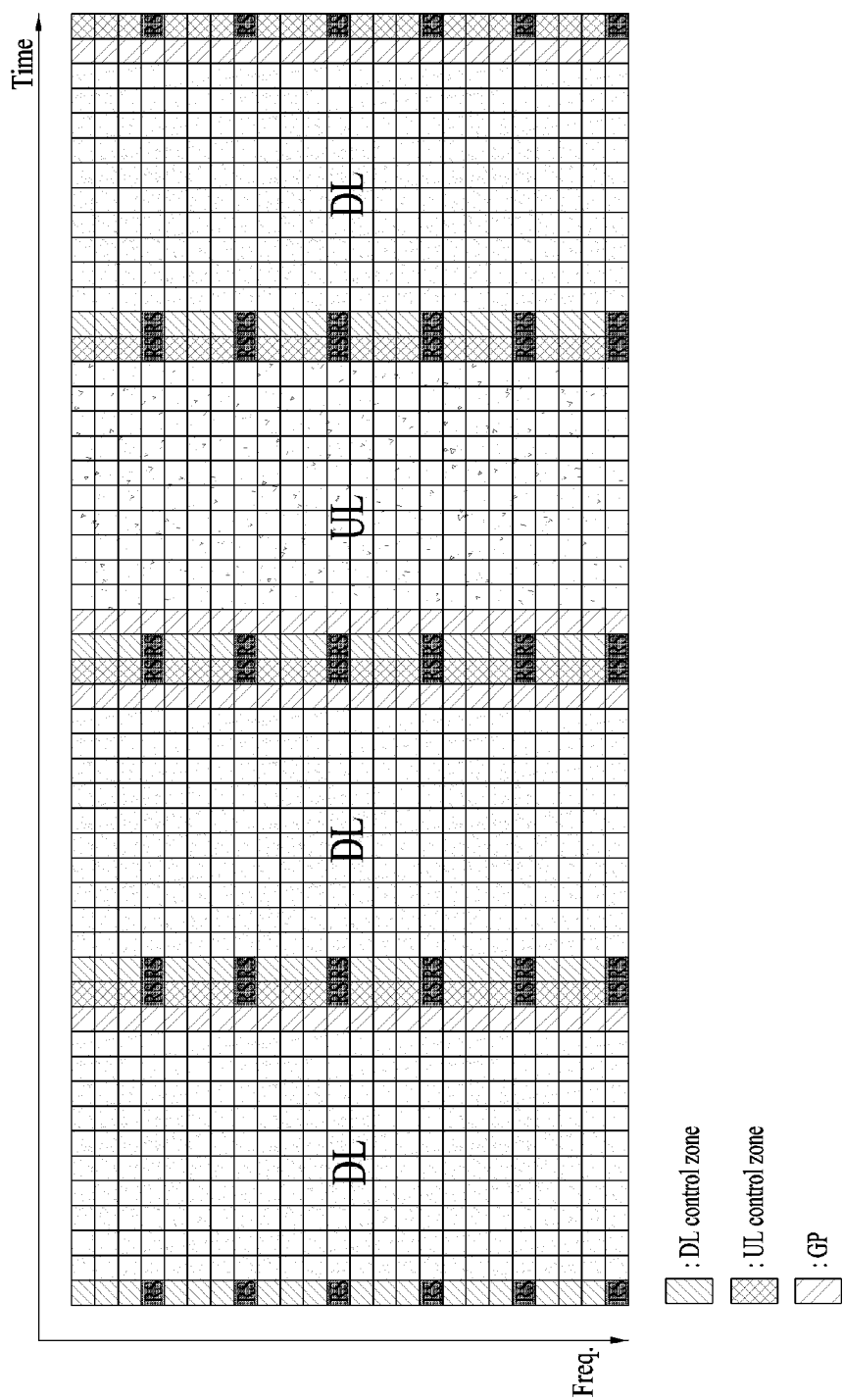
FIG. 12 is a diagram illustrating an example of a frame structure time-frequency resource on a TDD carrier.

FIG. 12 is a diagram illustrating an example of a frame structure time-frequency resource on a TDD carrier.

As shown in FIG. 12, a data zone of every subframe is allocated as a UL data zone or a DL data zone. Hence, DL/UL flexibility is lowered compared to the frame structure of the proposal 1. Yet, since the DL control zone and the UL control zone are still located within a single subframe, 'OTA (w/initiation)<1 ms' can be achieved by a scheduler. Moreover, since it is able to utilize the data zone as a DL data zone or a UL data zone by the scheduler, it is apparent that the frame structure is more DL/UL flexible compared to the legacy LTE TDD.

A length of a GP is configured by a multiple of a symbol length. This makes numerology (subcarrier spacing, CP length, symbol length, number of symbols in a TTI) used in TDD to be identically used in a FDD frame structure. In particular, it is a design method for providing commonality as much as possible in the TDD and FDD frame structures. As a result, it may be able to maintain a lot of common parts in a baseband operation.

For example, when a GP is designed by a length of half symbol without being maintained by the length of one symbol, if the same TTI is applied, the number of symbols or a CP length varies in TDD and FDD and it breaks unity in terms of an implementation device. As a result, it may implement TDD and FDD, respectively. On the contrary, if a GP length is maintained by a multiple of a symbol length, since it is able to commonly use a CP, a symbol length, and the like, it may have an advantage that a commonly used implementation part increases.

Proposal 2-2

Figure 13:
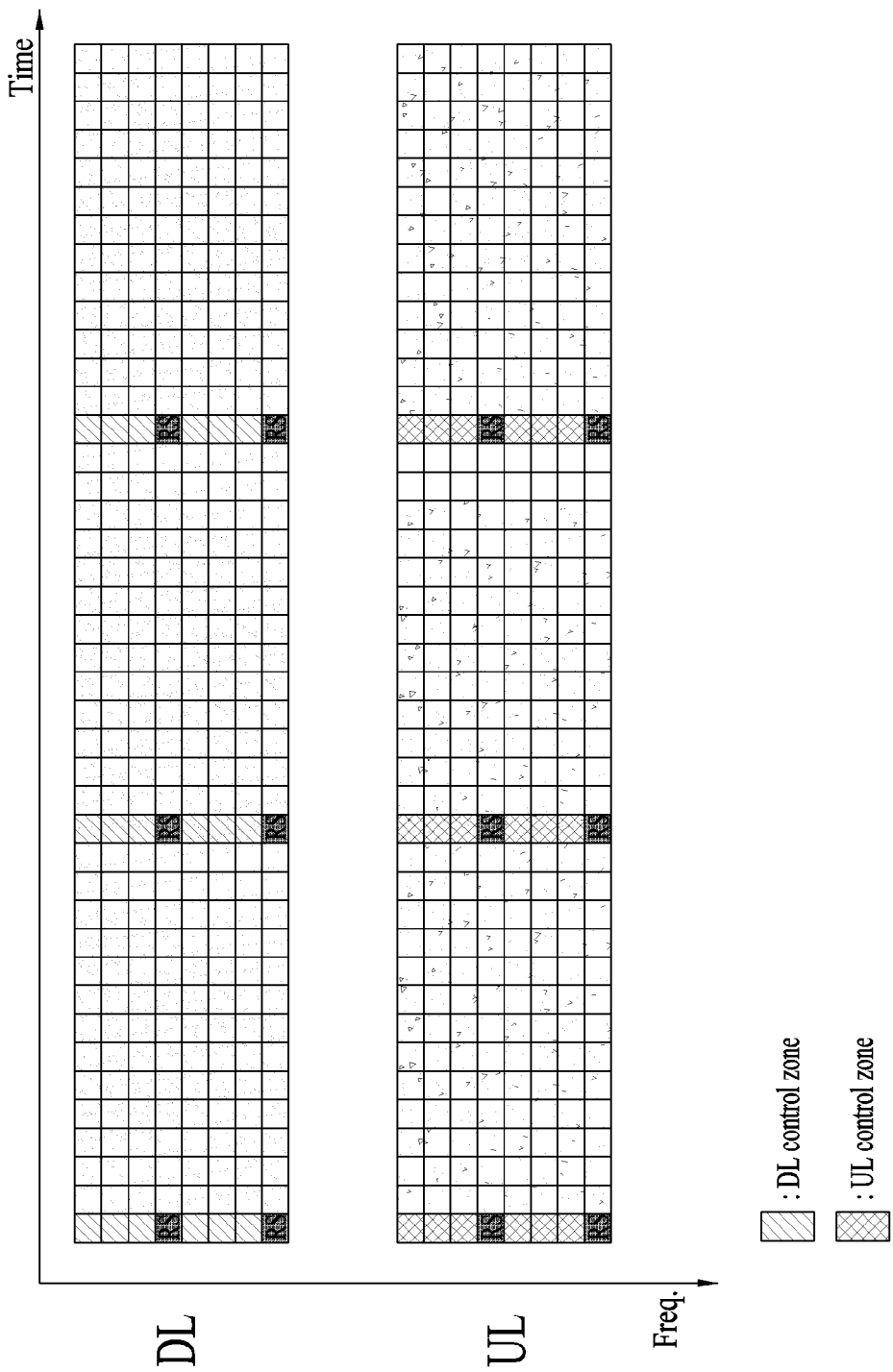
FIG. 13 is a diagram illustrating an example of a frame structure time-frequency resource on a FDD carrier.

FIG. 13 is a diagram illustrating an example of a frame structure time-frequency resource on a FDD carrier.

In FIG. 13, a subframe is mainly divided into a control zone and a data zone on a FDD carrier. In case of DL, the control zone is located at the first of the subframe and the data zone is located after the control zone. In case of UL, a UL control zone is located at the first of the subframe and the data zone is located after the UL control zone.

FIG. 13 illustrates a frame structure that a GP is utilized as a data and a control zone is located at the first part of a subframe in a legacy TDD frame structure. As mentioned in the foregoing description, commonality is maximized by maintaining a common part with the legacy TDD frame structure as much as possible.

As mentioned in the foregoing description, the frame structure according to the proposal provided by the present invention can achieve low latency (i.e., OTA (w/initiation) <1 ms) corresponding to 5G service requirement and provide DL/UL flexibility capable of efficiently supporting asymmetry of DL/UL traffic as much as possible.

In case of legacy LTE/LTE-A, as shown in FIG. 3, DL synchronization and transmission of essential system information can be performed via PSS, SSS or PBCH. On the contrary, a self-contained subframe structures, an adaptive/self-contained frame structure, and a TDD new frame structure considered in a next generation 5G system has no definition for broadcasting DL synchronization or system information. In particular, since the self-contained subframe structure and a new frame structure for 5G TDD system perform a TDD operation in an unfixed configuration, if a specific region for DL synchronization or system information is designated in a data zone, restriction of which DL operation is performed on the whole of frequency bands occurs. If the region for the definition is designated in a DL control zone (or a DL control channel), since a region within the control zone increases, it may cause the increase of control overhead and the decrease of system throughput. Hence, it is necessary to design a frame structure capable of transmitting a DL synchronization operation and system information of the self-contained frame structure for next generation 5G system. The present invention proposes a DL synchronization scheme and a system information transmission scheme appropriate for maintaining system throughput while DL/UL flexibility of the self-contained frame structure is not deteriorated.

The present invention proposes a DL synchronization scheme and a system information (hereinafter, SI) transmission scheme suitable for maintaining system throughput while DL/UL flexibility of the self-contained frame structure (Self-contained subframe structure and New frame structure for 5G TDD system) is not deteriorated. And, the present invention may also be identically applied to an adaptive/self-contained frame structure and a new frame structure for 5G FDD system.

Proposal 3: Hierarchical DL Synchronization and System Information Transmission

Design conditions for DL synchronization and SI transmission in LTE/LTE-A system are described in the following.

① Minimize cell search time performance in presence of inter-cell interference and frequency offset ② Minimize UE complexity ③ Minimize Signaling Overhead On the contrary, a DL synchronization scheme and an SI transmission scheme of self-contained frame structure considered in the next generation 5G system additionally have design principles described in the following in addition to the aforementioned design conditions.

④ Define DL synchronization and broadcasting of SI applicable to the self-contained frame structure.

⑤ A region for DL synchronization or broadcasting of SI does not reduce DL/UL flexibility of data zone.→(for this purpose, it is necessary that an SS (synchronization signal) is configured to a DL control zone.)

⑥ A region for DL synchronization or broadcasting of SI does not increase control overhead.→(for this purpose, it is necessary that SI is distributed to a plurality of subframes.)

The present invention proposes a structure that a synchronization signal 1 (SS1), a synchronization signal 2 (SS2) for performing DL synchronization and system information (SI) for obtaining cell-specific system information are transmitted in a DL control zone to maintain DL/UL flexibility of self-contained frame structures. For convenience of explanation, among the self-contained frame structures, the TDD new frame structure proposed in the FIG. 12 is explained as an example. As mentioned in the foregoing description, the present invention can also be applied to a new frame structure of FDD scheme and a frame structure of a self-contained scheme without being restricted to new frame structure of TDD scheme.

Figure 14:
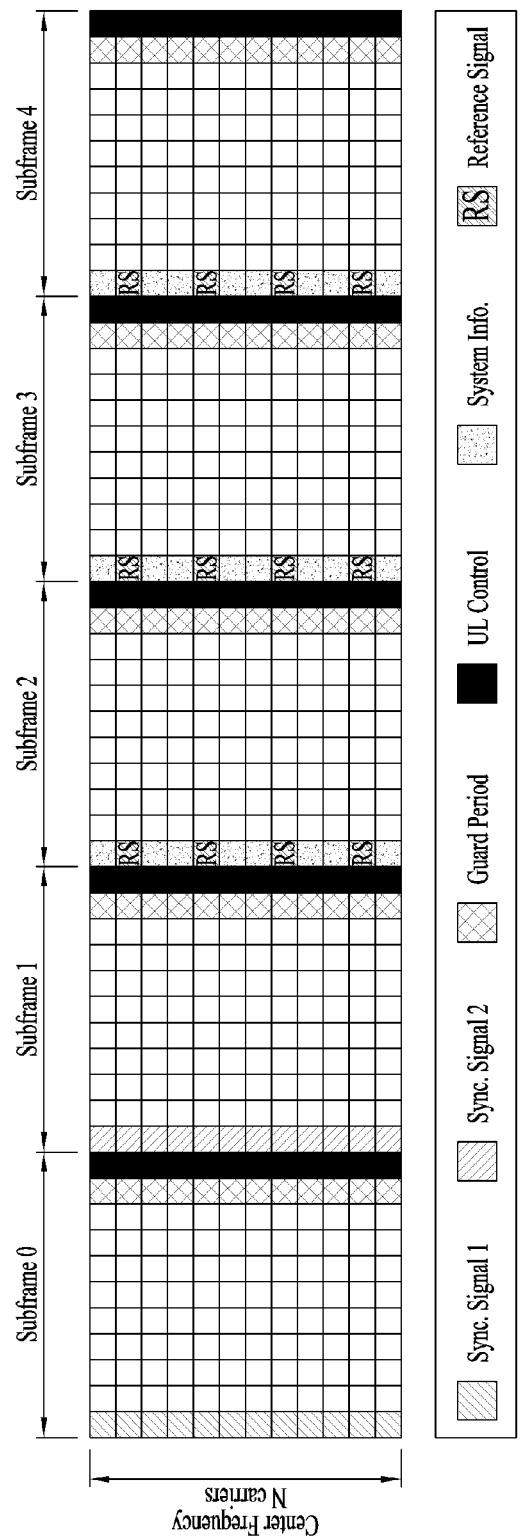
FIG. 14 is a diagram conceptually illustrating an SS/SI allocation region of a new frame structure of a TDD scheme proposed in the present invention.

FIG. 14 is a diagram conceptually illustrating an SS/SI allocation region of a new frame structure of a TDD scheme proposed in the present invention.

FIG. 14 illustrates a deployment concept of a synchronization signal 1 (SS1), a synchronization signal 2 (SS2), and system information (SI) in new frame structure of TDD scheme proposed in the present invention. As shown in FIG. 14, the first n number of symbols (e.g., n is equal to or greater than 1, preferably, the n may be specified by 1) is (are) configured as a DL control zone, and the last m number of symbols (e.g., m is equal to or greater than 1, preferably, the m can be specified by 1) is (are) configured as a UL control zone in the TDD new frame structure. The proposed new frame structure of TDD scheme performs TDD operation in an unfixed configuration. Hence, if a specific region for an SS (containing SS1 and SS2) or SI is designated in a data zone, a restriction of performing a DL operation on the whole of frequency bands occurs. Unlike the data zone, since a DL control zone is allocated by a DL zone only and a UL control zone is allocated by a UL zone only, it is able to transmit an SS or SI without deteriorating flexibility of the data zone.

Yet, if a region for an SS and SI is designated in the DL control zone, time axis extension of the DL control zone occurs according to sizes of the SS and the SI and it may cause system throughput loss due to the decrease of the data zone. Hence, if the region for the SS and the SI is configured by the first symbol of the DL control zone only, it may be able to minimize the throughput loss due to the decrease of the data zone.

For example, as shown in FIG. 14, an eNB may transmit the SS and the SI on N number of carriers of a center frequency corresponding to the minimum bandwidth determined by 5G system. In this case, the eNB may transmit an SS1 in a first symbol corresponding to a DL control zone of a subframe 0 as a single symbol in a frame. In this case, the subframe 0 corresponds to a subframe of a lowest index in a frame and most preceding subframe in a frame in time domain. Yet, the SS may also be configured in a first symbol of a different subframe without being restricted to the very first subframe of a frame. An SS2 may be transmitted in a first symbol corresponding to a DL control zone of a subframe 1 as a single symbol.

Then, SI is transmitted to a first symbol corresponding to a DL control zone ranging from a subframe 2 to a subframe 4 as a single symbol. In this case, an order and a range of subframes in which the SS or the SI is transmitted may vary depending on system environment. Although FIG. 14 illustrates an example that SI is continuously transmitted in 3 subframes, the SI may be transmitted in at least one subframe in a TDD frame. If the SI is transmitted in a plurality of subframes, similar to the example shown in FIG. 14, the SI may be transmitted in a plurality of contiguous subframes or can be transmitted in a plurality of discontinuous subframes. Although FIG. 14 illustrates a case that the SI is transmitted from a subframe 2 corresponding to a subframe contiguous to subframes 0 and 1 in which SS is transmitted, this is just an example only. The SI can be transmitted in a following subframe which is not contiguous to a subframe in which the SS is transmitted.

The SS1 is used for frame synchronization and may be configured by C number of sequences for cell search. A UE performs blind detection on the C number of sequences and can obtain an index of a transmitted sequence using the blind detection. In this case, the C corresponds to a cell index. In general, the C can determine up to 3 cells in terms of sectorization and the C can be differently configured according to system environment. When a UE performs blind detection on a sequence, the UE performs synchronization based on auto-correlation or cross-correlation. In addition, the UE may be able to perform channel estimation based on a known sequence after a sequence is detected.

An SS2 (Synchronization Signal 2) is used for frame synchronization and may be configured by L' number of sequences for cell search. A UE performs blind detection on the L' number of sequences and then induce an index of a transmitted sequence based on the blind detection. The SS2, which has L number of resource elements (REs), is configured by the L' number of sequences having a low cross-correlation. The UE is able to determine L' number of physical cell group IDs by performing auto/cross-correlation-based blind detection. In this case, L is different from L' according to system environment. If the L is identical to the L', the sequences can be configured as orthogonal sequences. If the L is smaller than the L', the sequences can be configured as non-orthogonal sequences. In this case, when the UE performs blind detection on the L' number of sequences, the UE may perform coherent detection based on channel estimation information of the SS1. Or, the UE may independently perform non-coherent detection on the SS2.

The SS1 is transmitted by repeating the same sequence. On the contrary, similar to legacy LTE, the SS2 is transmitted using a sequence of L' at $i^{th}$ transmission. The SS2 can be transmitted using a sequence of L'' in a manner of being specifically scrambled, cyclic shifted, or mapped to a different sequence at $(i+1)^{th}$ transmission. By doing so, the UE can determine C*L'*L'' number of physical cell IDs (PCIDs) through the C number of sequences of the SS1 and the L' and L'' number of sequences of the SS2. If the $i^{th}$ transmission and the $(i+1)^{th}$ transmission of the SS2 exist in a single frame, the UE is able to induce a start point of a frame via a sequence difference of the SS2.

Figure 15:
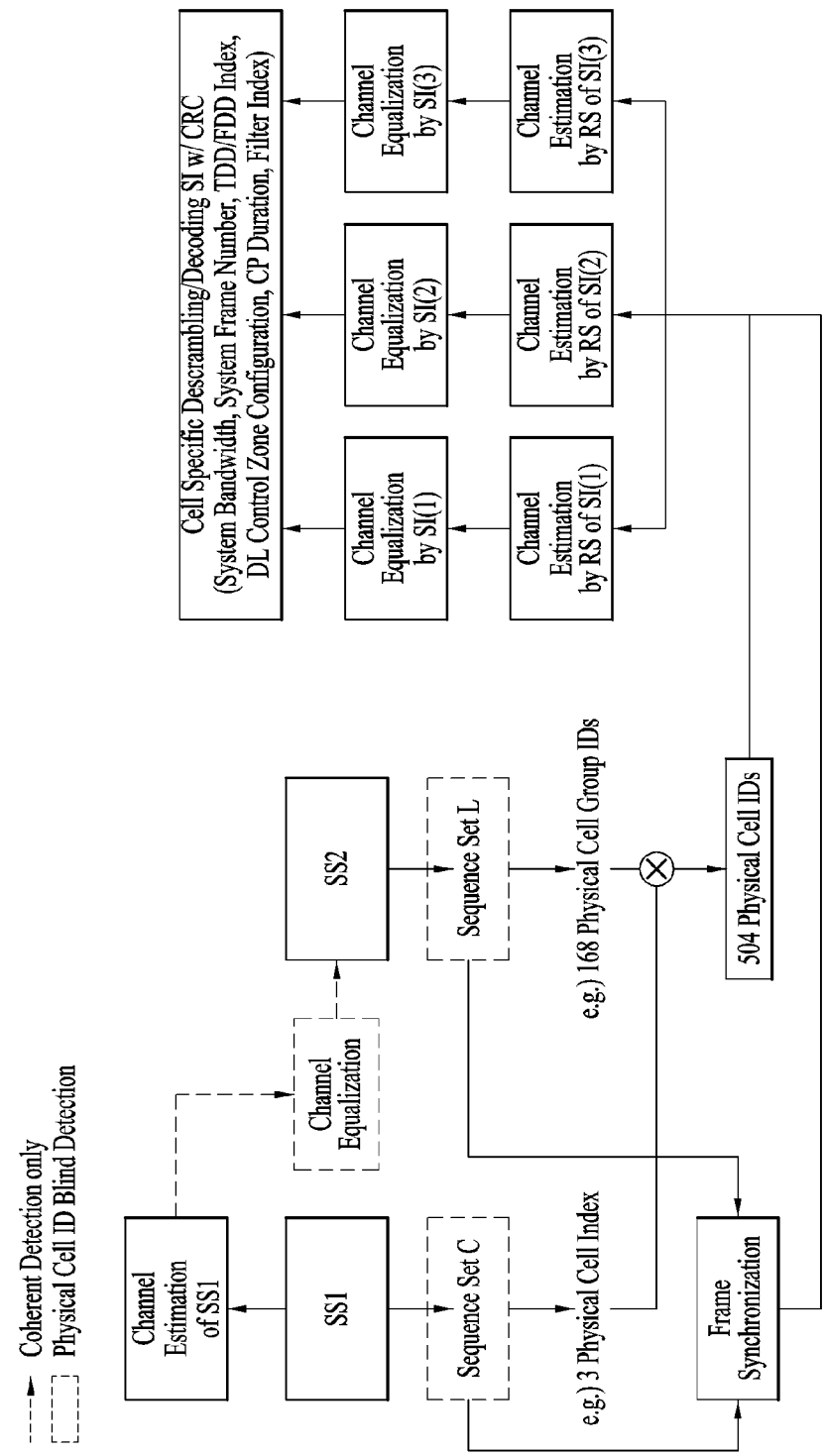
FIG. 15 is a diagram illustrating a synchronization procedure of an SS and a decoding procedure of an SI proposed in the present invention.

FIG. 15 is a diagram illustrating a procedure of SS synchronization and a decoding an SI proposed in the present invention.

FIG. 15 is a schematic diagram for an example of procedure of DL synchronization and an SI decoding in a new frame structure of the TDD scheme proposed in the present invention. As illustrated in FIG. 14, a UE performs blind detection on an SS1 via a first symbol of a subframe 0, obtains frame synchronization (or synchronization), and obtains a cell index (one index among C number of indexes) from (or based on) a physical cell ID group. The UE performs channel estimation based on a cell index obtained via the SS1. In case of a coherent detection scheme, blind detection is performed on a sequence applied to an SS2 corresponding to a first symbol of a subframe 1 after channel equalization is performed. By doing so, the UE is able to determine the L' number of sequences. In case of a non-coherent detection scheme, the UE performs blind detection on a sequence applied to the SS2 without performing channel equalization. If a change of a time axis channel is big, it may have excellent performance of the non-coherent detection.

A method of determining a physical cell ID (PCID) via a sequence used for the SS1 and the SS2 may vary depending on a sequence set. For example, assume that a sequence set C determined via the SS1 determines 3 cell indexes and a sequence set L determined via the SS2 determines 168 physical cell group IDs. Then, a UE is able to determine 3*168=504 PCIDs. The abovementioned scheme can be defined in advance according to a system. If the PCIDs are determined via the above scheme, it is able to know a sequence of a reference signal (RS) (or a reference signal included in a symbol in which SI is transmitted) within SI configured based on the PCIDs. Hence, channel estimation of an RS is performed through a PCID-based sequence and channel equalization of SI is performed based on obtained channel information. In this case, the channel estimation and the channel equalization can be individually performed according to an SI symbol or can be performed in a bundle in a manner of being grouped. After the channel equalization is performed on the SI, the UE can perform cell-specific descrambling and decoding according to a PCID. It may be able to check whether or not decoding of SI information is successfully performed via a cyclic redundancy check (CRC). In particular, although the UE performs blind detection on the SS1 and the SS2, it is not necessary for the UE to perform blind detection on the SI.

Unlike legacy LTE, the abovementioned scheme is performed in an unknown state of CP duration and TDD/FDD. In case of the adaptive/self-contained frame structure proposed in the, the TDD new frame structure, and the FDD new frame structure, since a DL control zone starts at a first symbol of each subframe, DL synchronization and SI decoding can be performed even when the CP duration and the TDD/FDD are unknown.

Proposal 4

In FIG. 14, the SI may be transmitted in a manner of being divided into a plurality of subframes and includes essential information necessary for performing initial access of a UE. In this case, the essential information necessary for performing the initial access of the UE may different depending on system environment. In general, the essential information includes a system bandwidth, a system frame number, a DL control zone configuration, a TDD/FDD Index, CP Duration, a CRC, and the like. In this case, the DL control zone configuration indicates length information or arrangement information for control information in a DL control zone. For example, the DL control zone configuration may include index information for indicating a position or a size of a region for physical hybrid-ARQ indicator information in the DL control zone.

In case of the legacy LTE, information of the TDD/FDD index and the CP duration was detected via hierarchical synchronization. Yet, it is unable to detect the information of TDD/FDD index and the CP duration via the scheme proposed in the present invention because the position of SS1 and the SS2 always same in a subframe. Hence, it is necessary that SI transmits information of resource assigned for the information of TDD/FDD index and the CP duration. It is necessary to additionally transmit 1 bit to indicate TDD or 1-DD. If a CP has two types in CP-OFDM, it is necessary to additionally transmit 1 bit to indicate CP duration. In case of using filtered OFDM corresponding to a new waveform, if a filter has two types, it may additionally transmit 1 bit to indicate a filter index. Information of the bit may increase according to a type of a predefined scheme.

If a UE decodes TDD/FDD index information (e.g., 1 bit) and CP duration index information (e.g., 1 bit) within SI, the UE can perform decoding on control information (in case of legacy LTE, PDCCH) of a DL control zone. The UE can perform blind decoding a plurality of control symbols within the DL control zone using the TDD/FDD index information and the CP duration index information within the SI and can search for common control information (in case of legacy LTE, SIB) based on decoding information. The common control information may exist in the DL control zone or a DL data zone.

In a next generation 5G system, an initial synchronization time requirement may different per a service scenario. In this case, it is able to obtain symbol timing by more quickly accumulating synchronization in a manner of increasing frequencies of the SS1 and the SS2 in a single frame.

However, periodic transmissions of plurality of SSs in a single frame occurs a problem which a start point of the frame is not recognized. Hence, the SS1 and the SS2 may be continuously arranged from a first frame in the single frame. For example, when the SS1 is divided into two, the SS2 is divided into two, and SI are divided into three in the single frame, the sequences and the SI can be transmitted from a subframe 0 to a subframe 6 in such a continuous order as [SS1, SS2, SI(1), SI(2), SI(3), SS1, SS2] in the subframes. In this case, the SS1 is repeatedly transmitted as the same sequence. Similar to the legacy LTE, the SS2 is transmitted as L' sequence in a subframe 1 and can be transmitted as L" sequence in a subframe 6 in a manner of being specifically scrambled, cyclic shifted, or mapped to a different sequence. The SI is transmitted in a manner that one bundle information ranging from SI(1) to SI(3) is separated from each other.

A UE can perform frame synchronization on the basis of a first SS. A repetition frequency of an SS and a separation transmission number of SI can be differently configured depending on a 5G system scenario. If a subframe is configured by 0.2 ms, SS1 and SS2 are repeatedly transmitted two times in every 2 ms. If it is assumed that synchronization is completed when SS1 and SS2 are accumulated 10 times in a worst case receiving end, synchronization can be performed within 10 ms.

Transmission frequencies of SS and SI may vary depending on system environment. For example, if the frequency is reduced by half due to the mitigation of a system synchronization requirement, the SS and the SI are transmitted using the same scheme in even-numbered frames such as frames 0, 2, 4, etc. In odd-numbered frames such as frames 1, 3, 5, etc., DL control information can be transmitted only without the SS and the SI.

If a subframe is configured by 0.2 ms, SS1 and SS2 are repeatedly transmitted two times in every 4 ms. If it is assumed that synchronization is completed when SS1 and SS2 are accumulated 10 times in a worst case receiving end, synchronization can be performed within 20 ms.

A transmission structure of the SS and the SI proposed in the present invention can be summarized as follows.

(1) The SS1 and the SS2 for performing DL synchronization and the SI for broadcasting system information are transmitted via a DL control zone only. The SSs and the SI are transmitted in a first symbol of each subframe on the N number of carriers of a center frequency.

A. Since it is unable to check a system bandwidth, SS and SI can be transmitted on the N number of carriers corresponding to the center frequency.

B. Since a first symbol of new frame structure of TDD scheme is used as a DL control zone on the whole band, SS and SI are transmitted in a first symbol of each subframe only.

C. If it is necessary for an RS for a DL control zone to exist in a first symbol only, SS and SI may exist in a second symbol. In this case, it is necessary for SS1, SS2, and SI to be positioned at a first symbol in control symbols except the RS. It is necessary to transmit the SS1, the SS2, and the SI to a single symbol at the same position in each subframe.

D. In particular, the SS1, the SS2, and the SI are transmitted to a first symbol only of each DL control zone in the new frame structure of TDD scheme. If a size of the SI exceeds one symbol, the SI is transmitted to a first symbol of each DL control zone of a plurality of subframes in a manner of being segmented.

(2) The SS1 is configured by the C number of sequences. The SS1 performs a frame synchronization function, a function of searching for C number of cells, and a function of performing channel estimation based on a detected sequence via auto/cross-correlation-based blind detection.

(3) The SS2 is configured by L number of REs and is configured by L' number of sequences having low cross-correlation. A UE determines a frame synchronization function and L' number of physical cell group IDs via auto/cross-correlation-based blind detection.

(4) If the L corresponding to the number of REs of the SS2 is identical to the L' corresponding to the number of sequences, it may use an orthogonal sequence. If L<L' is satisfied, it may use a non-orthogonal sequence set having low cross-correlation.

(5) An RS of each SI symbol is configured by physical cell ID based sequence.

(6) The SI delivers essential information necessary for performing initial access of a UE. The essential information includes a system bandwidth, a system frame number, a DL control zone configuration, TDD/FDD index information, CP duration (for CP-OFDM), filter index information (for filtered OFDM), and the like. If a transmitting end encodes the SI including a CRC, a receiving end checks whether or not the SI is successfully decoded.

(7) The UE performs decoding SIs in a bundle (the SIs are divided into a plurality of subframes), and check whether or not the SI is successfully decoded via a CRC.

(8) The SS1 and the SS2 included in a single frame can be repetitively transmitted from a first subframe. The SI can be transmitted in a manner of being divided according to information amount of the SI from a subframe appearing after a subframe in which the SS2 is transmitted. A UE can perform frame synchronization on the basis of a first SS1 and perform SI decoding based on the frame synchronization.

(9) A UE can obtain TDD/FDD index information and CP duration index information by performing decoding on the SI. The UE can perform decoding on control symbols belonging to a DL control zone based on the obtained TDD/FDD index information and the CP duration index information.

(10) It may be able to identify common control information based on decoding information on the control symbols belonging to the DL control zone. The common control information may exist in the DL control zone or a DL data zone.

As mentioned in the foregoing description, according to DL synchronization and SI transmission methods proposed by the present invention, it is able to minimize a system throughput loss while DL/UL flexibility of a self-contained frame structure is not deteriorated.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

A method of performing communication using a TDD frame in a wireless communication system and an apparatus therefor can be industrially applied to various wireless communication systems such as 3GPP LTE/LTE-A, 5G system, and the like.

What is claimed is:

1. A method for performing communication by a user equipment using a time division duplex (TDD) frame including a plurality of self-contained subframes in a wireless communication system, wherein each of the plurality of self-contained subframes includes a downlink control zone, a data zone and an uplink control zone in sequence, the method comprising:
receiving a first synchronization signal (SS) in a first symbol of a first subframe of the TDD frame,
wherein the first subframe is a starting subframe among the plurality of self-contained subframes, and the first symbol of the first subframe is included in the downlink control zone of the first subframe;
receiving a second SS consisting of L' sequences in a first symbol of a second subframe of the TDD frame, and L' is a natural number,
wherein the first symbol of the second subframe includes L resource elements, and L is a natural number,
wherein the second subframe is a second starting subframe among the plurality of self-contained subframes, and the first symbol of the second subframe is included in the downlink control zone of the second subframe; and
receiving system information in only a first symbol of at least one subframe comprising a third subframe of the TDD frame,
wherein the third subframe is a third starting subframe among the plurality of self-contained subframes, and the first symbol of the third subframe is included in the downlink control zone of the third subframe,
based on the system information being further transmitted in each of only a first symbol of the plurality of the self-contained subframes located after the third subframe, decoding all the system information transmitted in the first symbol of the third subframe and each of the first symbol of the plurality of the self-contained subframes located after the third subframe together,
wherein based on L being different from the L' sequences are non-orthogonal sequences,
wherein based on L being the same as the L' sequences are orthogonal sequences,
wherein the system information is only transmitted in the first symbol of the third subframe included in the downlink control zone of the third subframe and the first symbol of each of the plurality of the self-contained subframes included in the downlink control zone of the plurality of the self-contained subframe regardless of a size of the system information, and wherein based on the first SS only being transmitted on the first symbol of the first subframe and the second SS only being transmitted on the first symbol of the second subframe, the system information includes at least one of information for indicating the TDD frame, information for indicating a cyclic prefix (CP) duration and information for a filter index.

2. The method of claim 1, further comprising the steps of:
obtaining a physical cell identifier from the first SS and the second SS;
performing channel estimation for a reference signal on the first symbol of the at least one subframe based on an obtained physical cell identifier based sequence; and
decoding the system information based on information of the estimated channel.

3. The method of claim 1, further comprising
obtaining a cell index from the first SS;
obtaining a physical cell group identifier from the second SS; and
obtaining a physical cell identifier based on the obtained cell index and the obtained physical cell group identifier.

4. The method of claim 1, further comprising:
transmitting uplink control information through an uplink control zone containing at least one last symbol in the first subframe.

5. The method of claim 1, wherein the first subframe and the second subframe are consecutive in time.

6. The method of claim 2, wherein the decoding is performed after channel equalization is performed based on the information of the estimated channel.

7. A user equipment for performing communication using a time division duplex (TDD) frame including a plurality of self-contained subframes in a wireless communication system, wherein each of the plurality of self-contained subframes includes a downlink control zone, a data zone and an uplink control zone in sequence, the user equipment comprising:
a receiver; and
a processor,
wherein the processor configured to:
receive a first synchronization signal (SS) in a first symbol of a first subframe of the TDD frame,
wherein the first subframe is a starting subframe among the plurality of self-contained subframes, and the first symbol of the first subframe is included in the downlink control zone of the first subframe,
receive a second SS consisting of L' sequences in a first symbol of a second subframe of the TDD frame, and L' is a natural number,
wherein the first symbol of the second subframe includes L resource elements, and L is a natural number,
wherein the second subframe is a second starting subframe among the plurality of self-contained subframes, and the first symbol of the second subframe is included in the downlink control zone of the second subframe, and
receive system information in only a first symbol of at least one subframe comprising a third subframe of the TDD frame,
wherein the third subframe is a third starting subframe among the plurality of self-contained subframes, and the first symbol of the third subframe is included in the downlink control zone of the third subframe,
based on the system information being further in each of only a first symbol of the plurality of the self-contained subframes located after the third subframe, decode all the system information transmitted in the first symbol of the third subframe and each of the first symbol of the plurality of the self-contained subframes located after the third subframe together, wherein based on L being different from L', the L' sequences are non-orthogonal sequences, wherein based on L being the same as the L', the L' sequences are orthogonal sequences, wherein the system information is only transmitted in the first symbol of the third subframe included in the downlink control zone of the third subframe and the first symbol of each of the plurality of the self-contained subframes included in the downlink control zone of the plurality of the self-contained subframe regardless of a size of the system information, and wherein based on the first SS only being transmitted on the first symbol of the first subframe and the second SS only being transmitted on the first symbol of the second subframe, the system information includes at least one of information for indicating the TDD frame, information for indicating a cyclic prefix (CP) duration and information for a filter index.

8. The user equipment of claim 7, wherein the processor is configured to:
obtain a physical cell identifier from the first SS and the second SS;
perform channel estimation for a reference signal in the first symbol of the at least one subframe based on an obtained physical cell identifier based sequence; and
decode the system information based on information of the estimated channel.

9. The user equipment of claim 7, wherein the processor is further configured to perform decoding after channel equalization is performed based on information of the estimated channel.

10. The method of claim 1,
wherein each of the plurality of the self-contained subframes includes a guard period (GP) between the data zone and the uplink control zone,
wherein the GP is configured to have a length of k*1, wherein k is a natural number, and
wherein 1 is a length of a symbol included in the data zone.

* * * * *